United States Patent [19]

Härdtle

[11] 3,938,568

[45] Feb. 17, 1976

[54] APPARATUS FOR DEBARKING LOGS

[76] Inventor: Wilhelm Härdtle, Poststrasse 21, 7959 Wain, Krs. Biberach an der Riss, Germany

[22] Filed: Feb. 5, 1975

[21] Appl. No.: 547,373

[30] Foreign Application Priority Data

Feb. 6, 1974 Germany ........................ 2405639

[52] U.S. Cl. ............... 144/208 F; 198/27; 198/165; 198/190

[51] Int. Cl.$^2$ B27L 1/00; B65G 47/00; B65G 15/14

[58] Field of Search ........ 144/208 R, 208 A, 208 F; 198/27, 75, 165, 190; 214/18, 18 C, 338

[56] References Cited

UNITED STATES PATENTS 2,867,316 1/1959 Uhlenkott ........................ 144/208 F

FOREIGN PATENTS OR APPLICATIONS 148,033 2/1904 Germany ........................ 144/208 F 16,549 7/1907 Norway ........................ 144/208 F

*Primary Examiner*—Othell M. Simpson

*Attorney, Agent, or Firm*—Karl F. Ross; Herbert Dubno

[57] ABSTRACT

An apparatus for debarking logs has a plurality of longitudinally spaced frames each of which carries a pair of horizontally and transversely spaced upper wheels and at least one lower wheel below and between the upper wheels. At least one conveyor element is spanned over the wheels in each frame and has a pair of inner stretches defining a V in line with the inner stretches of the other frame and forming therewith a log-receiving cradle. At least one of the wheels, preferably the lower wheel is driven, and it is possible either to tip the frames so as to unload the logs or to cant them about vertical axes relative to the longitudinal direction of the logs so as to move the log along the apparatus.

14 Claims, 6 Drawing Figures

APPARATUS FOR DEBARKING LOGS

FIELD OF THE INVENTION

The present invention relates to an apparatus for removing bark, phloem, and the like from logs. More particularly this invention concerns as apparatus for spinning an elongated log about its longitudinal axis while a tool removes the bark and external fibers therefrom.

BACKGROUND OF THE INVENTION

Prior to the reduction of a log into planks, beams, and like semifinished pieces, it is necessary to remove the bark, phloem, and other outside fibers from the log. This is usually effected by supporting the elongated log horizontally and rotating it on its longitudinal axis as a tool, such as described in U.S. Pat. No. 3,351,109, is displaced longitudinally relative to the log. This debarking tool rips off all of the bark and outer fibers from the rapidly rotating log as the log and the tool move relatively to each other longitudinally. It is known to displace the logs under a fixed tool, or to displace a tool the length of the fixed log.

As it is being debarked the log is usually supported in the nip between two sets of rotating wheels or disks which are each rotatable about a respective horizontal axis parallel to the axis of the other set. The disks are rotated in the same rotational sense and are spaced apart by a distance determined by the diameter of the log being treated.

A considerable disadvantage of this system is that it is necessary carefully to space the set of disks apart according to the log size. If they are spaced too far apart the log will drop down between them and if they are too close together the log will tend to jump off the apparatus.

Another disadvantage of this known system is that a log which is not relatively straight or is otherwise of uneven contours strikes the disks extremely hard at certain locations as it is rotated at high speed. This causes rapid wear of the machine, and even occasionally damages it so badly that it is necessary to stop the operation and repair or replace one of the disks before continuing.

OBJECTS OF THE INVENTION

It is therefore an object of the present invention to provide an improved apparatus for debarking a log.

Another object is the provision of such a device which does not present the above-described adjustment problem.

Yet another object is to provide an apparatus for rotating a log as it is debarked which is not readily damaged by a nonstraight log.

SUMMARY OF THE INVENTION

This object is attained according to the present invention in an apparatus for rotating a log for removal therefrom by a tool of bark and the like and comprising at least two longitudinally and horizontally spaced frames, a pair of horizontally and transversely spaced upper wheels on each of the frames, at least one lower wheel on each of the frames below and between the respective upper and lower wheels, and at least one endless conveyor element spanned over the wheels on each frame and having a pair of inner stretches defining a V in line with the inner stretches of the other frame and forming therewith a log-receiving cradle. The inner stretches in accordance with this invention lie at an angle of between 60° and 120° to each other and approach each other within a fraction of an inch at most at the lower end. Thus a log will lie in this cradle formed by these endless conveyor elements at a height of different diameters. Small-diameter logs will ride relatively low in the cradle and large-diameter logs relatively high, this difference being readily compensated for by the bark-removing tool.

According to another feature of this invention two such conveyor elements are provided along with two such lower wheels, both of the lower wheels being rotatable about a common horizontal axis. Each belt is spanned over a respective upper and lower wheel so that the inner stretch formed by the one belt crosses the inner stretch formed by the other, thereby reducing the gap between them to nothing so that it is impossible for a log to drop between them.

In accordance with another feature of this invention a single conveyor element is used at each frame and the structures are each defined between a respective upper wheel and a respective lower idler wheel that deflects the belt inwardly to reduce the nip between them to a fraction of an inch at most.

In accordance with yet another feature of the present invention the two frames are tippable about a horizontal axis passing advantageously through the rotation axis of the lower wheels. Thus the apparatus is pivoted until one of the stretches lies generally horizontally so that the log can readily be rolled off. This is a considerable advantage over the prior-art systems using separate throwing arms for pushing the log out from between the debarking support disks.

The frames according to a further feature of my present invention are all linked together and pivotal about respective vertical axes passing up through the center of the V formed by the inner structures of each frame. In this manner the rotation frames of the endless conveyor belt can be arrayed at a slight angle to the longitudinal direction of the log so as to cause the log to move longitudinally through the apparatus as it is rotated.

The apparatus according to the present invention therefore does not require any adjustment to accommodate logs of different diameters. Thus it is possible to simply provide it at one end of a loading chute so as to debark logs of whatever diameters as they arrive. It can also be provided on a wagon that is passed under the debarking tool and is then sent off to the various sorting boxes for loading of the stripped log into the appropriate box. In addition due to the use of the endless conveyor belts it is possible for the apparatus according to the present invention to strip logs of nonstraight contours. This is possible because the belts, chains, cables or other endless conveyor elements are not rigid and can therefore accept a certain amount of flexion without breaking.

BRIEF DESCRIPTION OF THE DRAWING

The above and other objects, features, and advantages of the invention will become more readily apparent from the following description, reference being made to the accompanying drawing in which.

SPECIFIC DESCRIPTION

Figure 1:
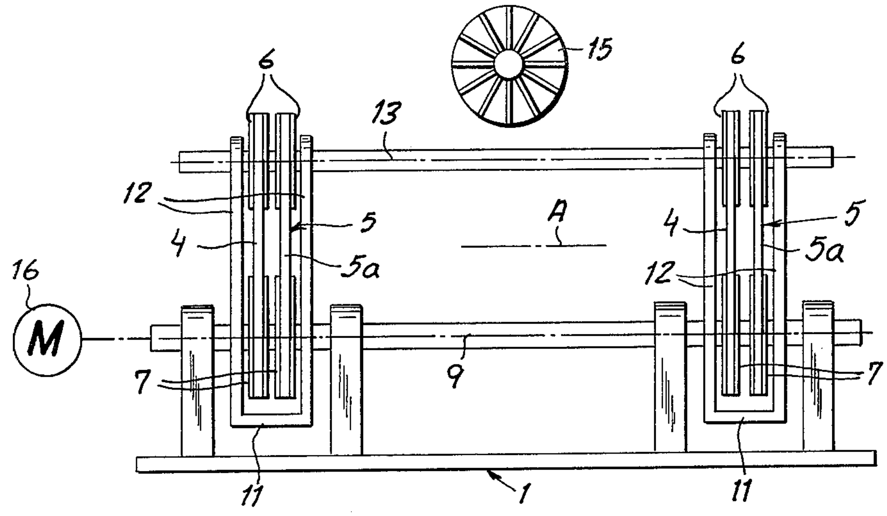
FIGS. 1, 2, and 3 are side, top, and end views, respectively, of an apparatus according to the present invention.
Figure 2:
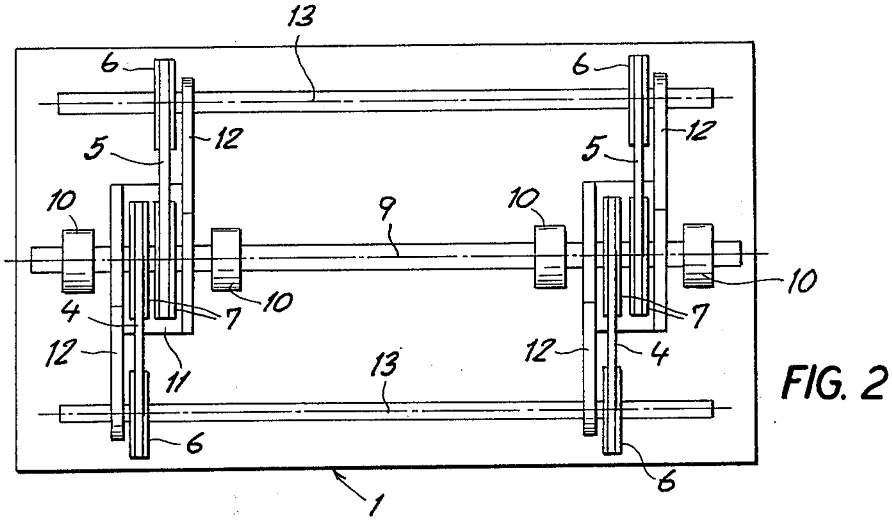
Figure 3:
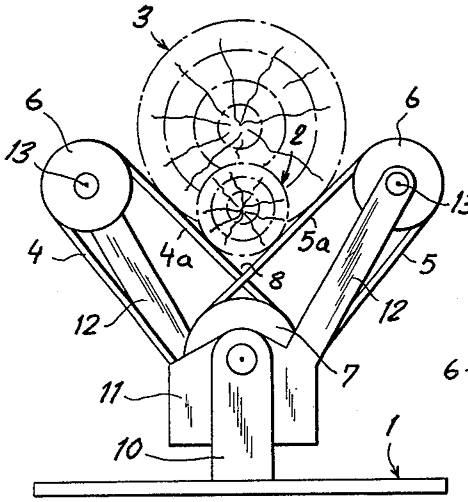

The apparatus according to the present invention as shown in FIGS. 1–3 comprises a base plate 1 which may be fixed underneath a movable debarking tool or may be movable under a fixed debarking tool 15 as described in U.S. Pat. No. 3,351,109. The arrangement is adapted to receive small-diameter logs 2 or large-diameter logs 3 (FIG. 3) and has a pair of support frames 11 whose arms 12 support at their upper ends upper pulley wheels 6. In addition each frame 11 is provided below and between its upper wheel 6 with a pair of coaxial pulley wheels 7 rotatable about an axis 9 parallel to the horizontal axes 13 of the upper wheel 6. Each frame 11 is also provided with a pair of belts 4 and 5 each spanned over a respective upper wheel 6 and a respective lower wheel 7. The belts 4 and 5 have inner stretches 4*a* and 5*a* which cross at 8 so that it is impossible for a log to drop down between these two belts 4 and 5.

A motor 16 drives a horizontal shaft 9 which is also the rotation axis for the four lower pulleys 7 and which is journaled to both sides of each frame in lugs 10 secured to the base plate 1. In this manner the belts 4 and 5 all move with an identical peripheral speed and pulleys 7 are all rotated in the same sense so that one of the inner stretches 4*a* and 5*a* will always be moving down while the other is moving up.

Figure 4:
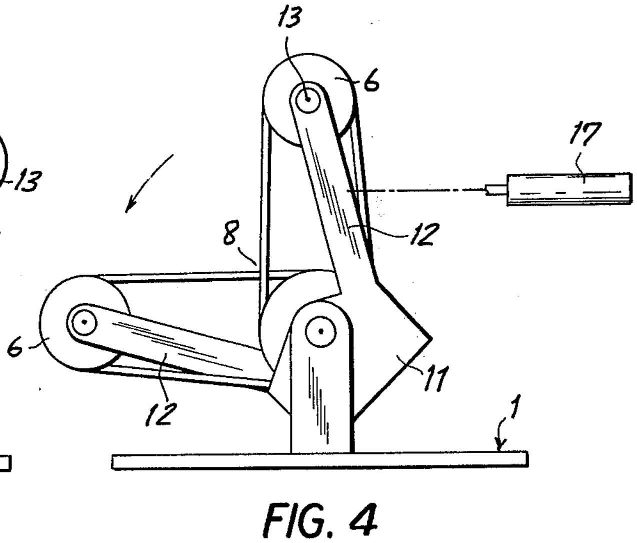
FIG. 4 is a view similar to FIG. 3 illustrating the machine in another operative position.

As shown in FIG. 4 a hydraulic cylinder 17 is operable so as to tilt the two frames 11 in a direction 15 from which a position in which these two frames are symmetrical about a vertical plane passing through axis 9 into a position wherein the one stretch 4*a* lies generally horizontally. In this tipped position a log lying in the cradle formed by the four inner stretches readily is rolled off of the device and into a processing chute or the like.

Figure 5:
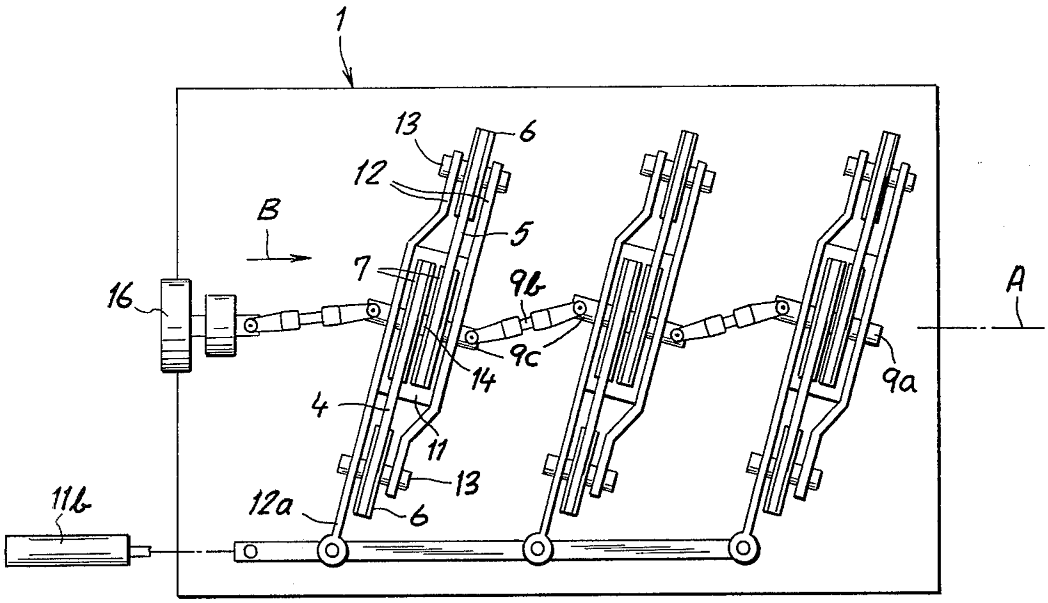
FIG. 5 is a top view of another arrangement in accordance with this invention.

The arrangement shown in FIG. 5 uses the reference numerals of FIG. 1 and FIG. 4 for identical structure. In this arrangement however each of the frames 11 is pivotal about a vertical axis 14 on the base plate 1. This arrangement has no single continuous shaft 9 but a short stub shaft 9*a* interconnected by telescoping shafts 9*d* connected to ends of the stub shafts by universal joints 9*c*. In addition one arm 12 of each of the frames 11 is extended at 12*a* and connected to an actuating link 11*a* operated via a pneumatic cylinder 11*b*. Thus the frames 11 can all be set so that the endless chains or belts 4 and 5 rotate in respective and parallel planes and are either perpendicular to the longitudinal axis A of the apparatus or at a slight angle thereto such as shown in FIG. 5. In this latter position it is possible to advance a log placed in a cradle formed by the three frames 11 in a direction as shown by arrow B. The angle at which the frames 11 are set determines the speed of advance. Indeed it is impossible with such a device to reverse the direction of travel in case it is desired to pass the log again underneath the debarking tool in the opposite direction.

Figure 6:
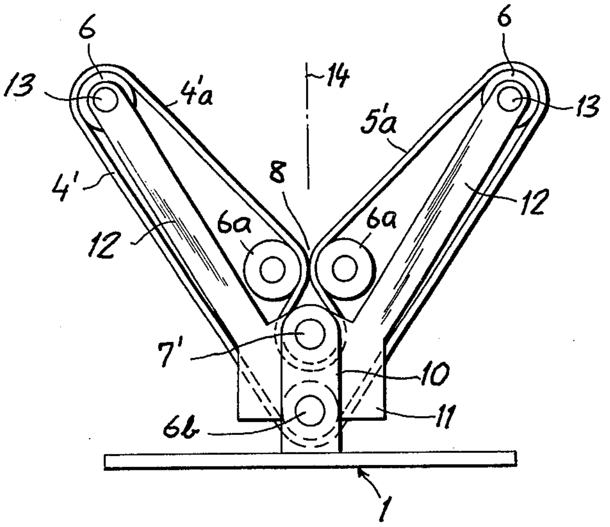
FIG. 6 is an end view of yet another apparatus according to the present invention.

The arrangement shown in FIG. 6 is also similar to that shown in FIGS. 1–4 but here a single belt 4' is dsed which is spanned at the nip 8 over two idler wheels 6*a* and then over a single central lower pulley 7'. The nip 8 in this arrangement is therefore only a fraction of an inch so that it is impossible for a log to become wedged therein. The belt 4' also passes over an outside idler wheel 6*b*. Such an arrangement is advantageous because the axial or longitudinal length of each frame 11 is greatly reduced and it is possible to provide these frames 11 only a few inches apart for the debarking of very short logs.

I claim:

1. An apparatus for rotating a log for removal therefrom by a tool of bark and the like, said apparatus comprising:

at least two longitudinally and horizontally spaced frames;

a pair of horizontally and transversely spaced upper wheels on each of said frames;

at least one lower wheel on each frame below and between the respective upper wheels;

at least one endless conveyor element spanned over the wheels on each frame and having a pair of inner stretches defining a V in line with the inner stretches on the other frame and forming with the other inner stretches a log-receiving cradle;

drive means for displacing said element to rotate a log received in said cradle, two such lower wheels and two such conveyor belts each being spanned over a respective upper wheel and a respective lower wheel are provided on each frame, said lower wheels of each frame being coaxially coupled.

2. The apparatus defined in claim 1 further comprising means for tipping said frames jointly about a horizontal longitudinal axis below said cradle.

3. The apparatus defined in claim 1 wherein said stretches are straight and define an angle between 60° and 120°.

4. An apparatus for rotating a log for removal therefrom by a tool of bark and the like, said apparatus comprising:

at least two longitudinally and horizontally spaced frames;

a pair of horizontally and transversely spaced upper wheels on each of said frames;

at least one lower wheel on each frame below and between the respective upper wheels;

at least one endless conveyor element spanned over the wheels on each frame and having a pair of inner stretches defining a V in line with the inner stretches on the other frame and forming with the other inner stretches a log-receiving cradle;

drive means for displacing said element to rotate a log received in said cradle each frame being provided with a pair of idler wheels above and to either side of the respective lower wheel and below and between the respective upper wheels, said element of each frame passing between the respective idler wheels and around the respective lower wheels, said stretches being defined between the upper wheels and the idler wheels.

5. The apparatus defined in claim 4 further comprising means for tipping said frames jointly about a horizontal longitudinal axis below said cradle.

6. The apparatus defined in claim 4 wherein said stretches are straight and define an angle between 60° and 120°.

7. An apparatus for rotating a log for removal therefrom by a tool of bark and the like, said apparatus comprising:

at least two longitudinally and horizontally spaced frames;

at least one lower wheel on each frame below and between the respective upper wheels;

at least one endless conveyor element spanned over the wheels on each frame and having a pair of inner stretches defining a V in line with the inner stretches on the other frame and forming with the other inner stretches a log-receiving cradle;

drive means for displacing said element to rotate a log received in said cradle; and means for tipping said frames jointly about a horizontal longitudinal axis below said cradle, said lower wheels lay coaxial with the longitudinal tipping axis.

8. The apparatus defined in claim 7, further comprising a shaft lying on said tipping axis and carrying said lower wheels.

9. The apparatus defined in claim 7 wherein said stretches are straight and define an angle between 60° and 120°.

10. An apparatus for rotating a log for removal therefrom by a tool of bark and the like, said apparatus comprising:

at least two longitudinally and horizontally spaced frames;

at least one lower wheel on each frame below and between the respective upper wheels;

at least one endless conveyor element spanned over the wheels on each frame and having a pair of inner stretches defining a V in line with the inner stretches on the other frame and forming with the other inner stretches a log-receiving cradle;

drive means for displacing said element to rotate a log received in said cradle; and means for pivoting said frames jointly and in the same sense about respective vertical axes passing through the frames and the cradle; and a plurality of shafts carrying said lower wheels and a plurality of shaft connectors and universal joints interconnecting said shafts for joint rotation of said lower wheels.

11. The apparatus defined in claim 10 wherein said means for pivoting includes an extension arm on each frame and a link interconnecting the ends of said arms.

12. The apparatus define in claim 10 further comprising means for tilting said frames jointly about a horizontal longitudinal axis below said cradle.

13. The apparatus defined in claim 10 wherein said stretches are straight and define an angle between 60° and 120°.

14. An apparatus for rotating a log for removal therefrom by a tool of bark and the like, said apparatus comprising:

at least two longitudinally and horizontally spaced frames;

a pair of horizontally and transversely spaced upper wheels on each of said frames;

a pair of lower wheels each associated with a respective one of said upper wheels and mounted on at least one of said frames;

at least one endless conveyor element spanned over said wheels and defining a pair of straight inner stretches defining a V with the inner stretches converging toward an apex at said V to form a log-receiving cradle, said upper and lower wheels spanning said stretches tightly between them to form the legs of the V; and drive means for displacing said element to rotate a log received in said cradle.

* * * * *